United States Patent [19]

Yamamoto et al.

[11] Patent Number: 4,787,134
[45] Date of Patent: Nov. 29, 1988

[54] AUTOMATIC TOOL EXCHANGE APPARATUS

[75] Inventors: Tanji Yamamoto, Hiroshima; Yohinori Abe, Higashihiroshima, both of Japan

[73] Assignee: Mazda/Motor Corporation, Hiroshima, Japan

[21] Appl. No.: 97,609

[22] Filed: Sep. 16, 1987

[30] Foreign Application Priority Data

Sep. 19, 1986 [JP] Japan .................. 61-219649
Sep. 19, 1986 [JP] Japan .................. 61-219650
Sep. 19, 1986 [JP] Japan .................. 61-222929

[51] Int. Cl.⁴ .......................................... B23Q 3/157
[52] U.S. Cl. .......................................... 29/568
[58] Field of Search .......................................... 29/568

[56] References Cited

U.S. PATENT DOCUMENTS 4,499,650 2/1985 Cannon et al. .................. 29/568
4,759,113 7/1988 Hunkeler .................. 29/568

FOREIGN PATENT DOCUMENTS

47-25622 7/1972 Japan .
58-28446 2/1983 Japan .................. 29/568
60-186343 9/1985 Japan .................. 29/568

Primary Examiner—Gil Weidenfeld
Assistant Examiner—Steven C. Bishop
Attorney, Agent, or Firm—Lynn L. Augspurger

[57] ABSTRACT

An automatic tool exchange apparatus includes a magazine for holding a plurality of freely detachable tools, a machine tool spindle whose distal end has a collet chuck in which a tool is loaded and which is tightened by a screw ring, a quill arm movable swingably and axially for engaging the screw ring, whereby rotation of the screw ring is inhibited, spindle rotating mechanism for rotating the spindle in a state where rotation of the screw ring is inhibited by the quill arm, whereby the spindle and screw ring are caused to rotate relative to each other to loosen the collet chuck, an exchange arm movable swingably between the spindle and magazine and axially for extracting one tool held by the magazine and mounting the one tool on the distal end of the spindle, swinging mechansim for swinging the quill arm and the exchange arm, and moving mechanism for moving the quill arm and the exchange arm in the axial direction.

16 Claims, 11 Drawing Sheets

AUTOMATIC TOOL EXCHANGE APPARATUS

BACKGROUND OF THE INVENTION

This invention relates to an automatic tool exchange apparatus in which a wearable tool such as a grindstone is exchanged when it is worn beyond its service life or in which one tool is selected from a wide variety of tools depending upon the particular job and is exchanged for and used in place of another tool.

In general, when a wearable tool such as a grindstone is worn beyond its service life in a grinding operation, the grindstone must be exchanged for a new grindstone. Accordingly, a grindstone exchange apparatus disclosed in e.g. the specification of Japanese Patent Publication (KOKOKU) No. 47-25622 has been proposed for the purpose of exchanging grindstones automatically.

The grindstone exchange apparatus disclosed in the above-mentioned patent publication has a grindstone carrying device for grasping and detaching a grindstone, which has completed prescribed grinding work, from a grinding device, and for carrying the grindstone to a storage device where the grindstone is deposited. The grindstone carrying device then grasps and detaches a grindstone to be used next from the storage device, carries this grindstone to the grinding device and loads it on the grinding device. A grindstone exchange apparatus of this kind is capable of exchanging grindstones rapidly and easily.

However, in a conventional exchange apparatus of the type described in the aforementioned patent publication, a grindstone carrier is provided with a grindstone sleeve locking portion and a hole into which a clamp screw is fitted. As a result, the grindstone carrier is complicated in construction and it is difficult to control the operation thereof. In addition, the overall arrangement is complex.

SUMMARY OF THE INVENTION

The present invention has been contrived in view of the aforementioned circumstances and its object is to provide an automatic tool exchange apparatus capable of exchanging tools reliably by way of a simple arrangement.

According to the present invention, the foregoing object is attained by providing an automatic tool exchange apparatus comprising: a magazine for holding a plurality of tools in a freely detachable manner; a spindle of a machine tool a distal end whereof has a collet chuck in which a tool is loaded and which is tightened by a screw ring; a quill arm movable swingably and in an axial direction for engaging the screw ring, whereby rotation of the screw ring is inhibited; spindle rotating means for rotating the spindle in a state where rotation of the screw ring is inhibited by the quill arm, whereby the spindle and screw ring are caused to rotate relative to each other to loosen the collet chuck; an exchange arm movable swingably between the spindle and magazine and in an axial direction for extracting one tool held by the magazine and mounting the one tool on the distal end of the spindle; swinging means for swinging the quill arm and the exchange arm; and moving means for moving the quill arm and the exchange arm in the axial direction.

In accordance with the arrangement of the invention as described hereinabove, the exchange arm and quill arm are both held at standby positions facing the magazine during machining performed by a tool. With the start of tool exchange operation, the exchange arm and quill arm are both swung to positions facing the spindle of the machining mechanism. The quill arm is moved in the axial direction to engage the screw ring of the collet chuck provided on the distal end of the spindle, thereby inhibiting the rotation of the screw ring. The exchange arm similarly moves in the axial direction and grasps a tool attached to the end of the spindle via the collet chuck. By rotating the spindle, the screw ring causes the tool held tightly by the collet chuck to be loosened from the chuck. The exchange arm is then moved in the axial direction so as to return to its original position, thereby detaching the freed tool from the spindle, and is swung to the magazine to place the used tool therein. The quill arm continues to hold the screw ring fixed. Thereafter, the exchange arm extracts a new tool from the magazine and is again swung toward the spindle to load this tool in the collet chuck of the spindle. The spindle is then rotated in a direction opposite that of the previous rotation, whereby the tool is attached to the distal end of the spindle via the collet chuck. This is followed by swinging the exchange arm and quill arm back to their standby positions, thereby completing one tool exchange cycle.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

One embodiment of an automatic tool exchange apparatus according to the invention will now be described in detail with reference to the drawings for a case where the embodiment is applied to an automatic grindstone exchange apparatus.

Figure 1:
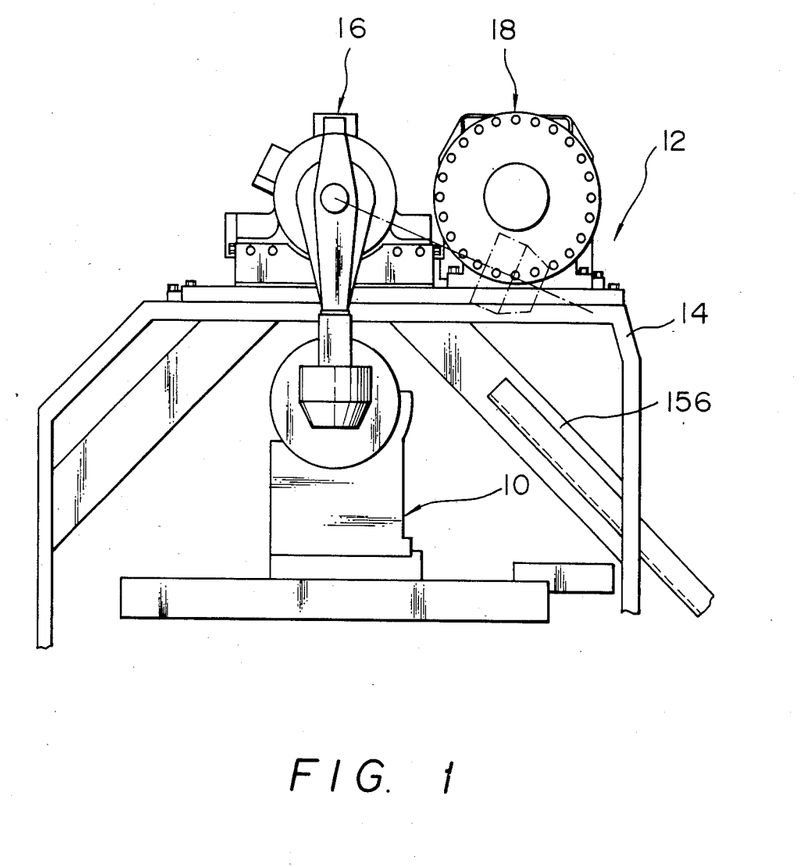
FIG. 1 is a front view illustrating one embodiment of an automatic tool exchange apparatus according to the present invention together with a grindstone apparatus functioning as a machine tool.
Figure 2:
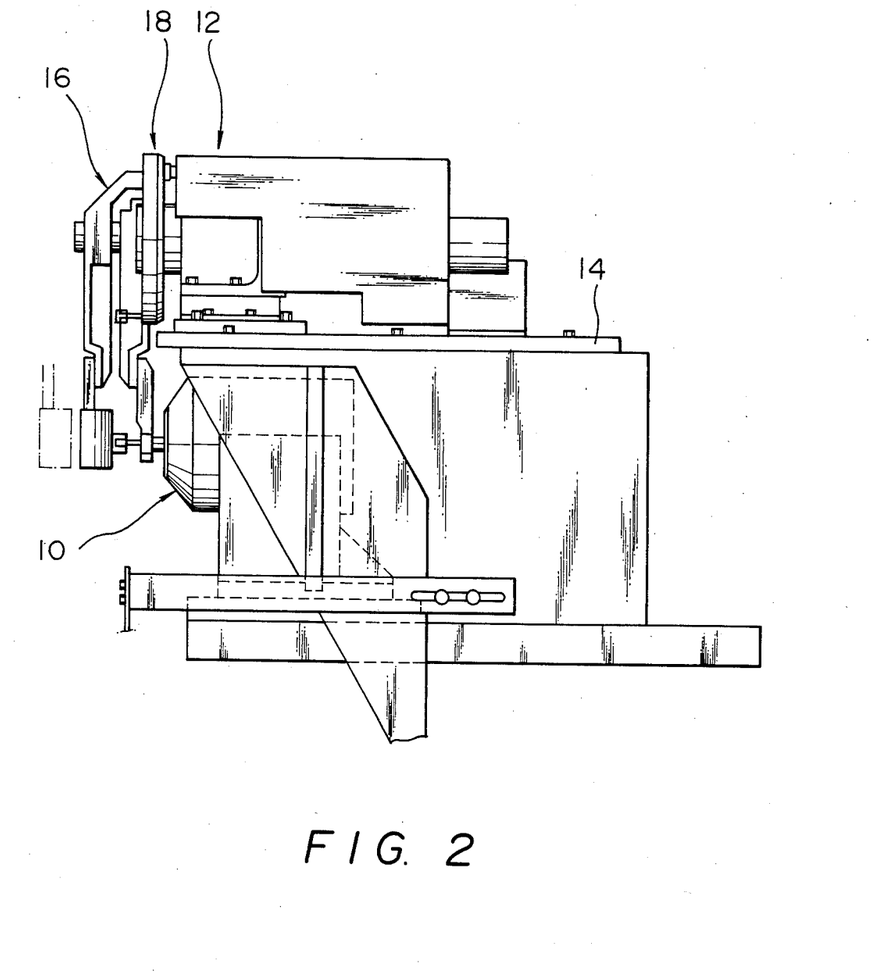
FIG. 2 is a side view illustrating the automatic tool exchange apparatus and grindstone apparatus of FIG. 1.

As shown in FIGS. 1 and 2, an automatic grindstone exchange apparatus 12 of the illustrated embodiment is arranged above a grindstone apparatus 10 serving as a machine tool.

The automatic grindstone exchanging apparatus 12 comprises a table 14 provided so as to straddle the grindstone apparatus 10, and an exchanging mechanism 16 and magazine mechanism 18 arranged side by side on the table 14. The exchanging mechanism 16 is adapted to detach and discard a grindstone 20 that has finished being used by the grindstone apparatus 10, described below, extract a new grindstone 20 a number of which are being held by the magazine mechanism 18, described below, and mount the new grindstone on a spindle 22 of the grindstone apparatus 10.

Figure 3:
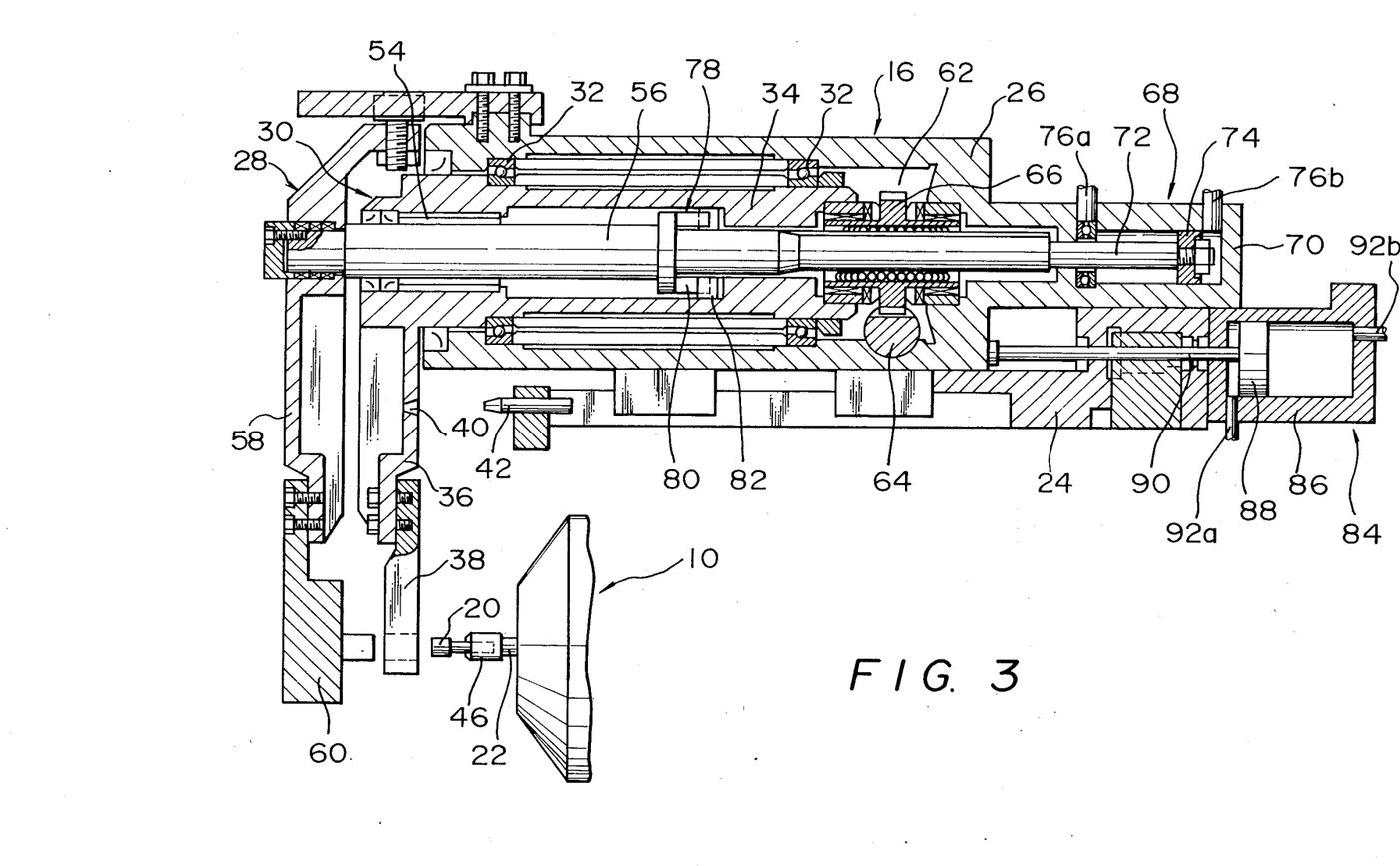
FIG. 3 is a sectional view showing an exchanging mechanism of the automatic tool exchange apparatus extracted in a state where an exchange arm assembly and quill arm assembly are both spaced away from a spindle.

As shown in FIG. 3, the exchanging mechanism 16 has a support base 24 secured on the table 14, a slide base 26 supported on the support base 24 so as to slide freely in the axial direction thereof (i.e. to the left and right in the Figure), and an exchange arm assembly 28 and quill arm assembly 30 arranged to swing freely about the same swing axis inside the slide base 26.

The slide base 26 is hollow and open at its front end. The quill arm assembly 30 is provided inside the hollow portion of the slide base 26 and is capable of swinging freely but is incapable of sliding. More specifically, the quill assembly 30 has a quill arm shaft 34 rotatably supported via a pair of bearings 32 inside the hollow portion of the slide base 26, a quill arm body 36 integrally mounted on the front end of the quill arm shaft 34, namely on the end projecting forwardly from the slide base 26, so as to extend in the radial direction, and an engaging portion 38 secured on the distal end of the quill arm body 36 for engaging the screw ring of a collet chuck mounted on the spindle 22 of the grindstone apparatus 10, thereby inhibiting the rotation of the screw ring.

Like the slide base 26, the quill arm shaft 34 is hollow and open at its front end. The exchange arm assembly 28 is provided inside the hollow portion of the quill arm shaft 34 and is capable of swinging freely about a swing axis, which is the same as that of the quill arm shaft 34, and of sliding freely. The quill arm body 36 includes a conical hole 40. As will be described below, a positioning pin 42 attached to the support base 24 is inserted, in an inwardly slid state, into the conical hole 40 after the quill arm assembly 30 is swung from a standby position where it opposes the magazine mechanism 18 to a position at which it opposes the spindle 22 of the grindstone apparatus 10. This assures that the rotational position of the quill arm body 36 will be set correctly.

Figures 4, 5:
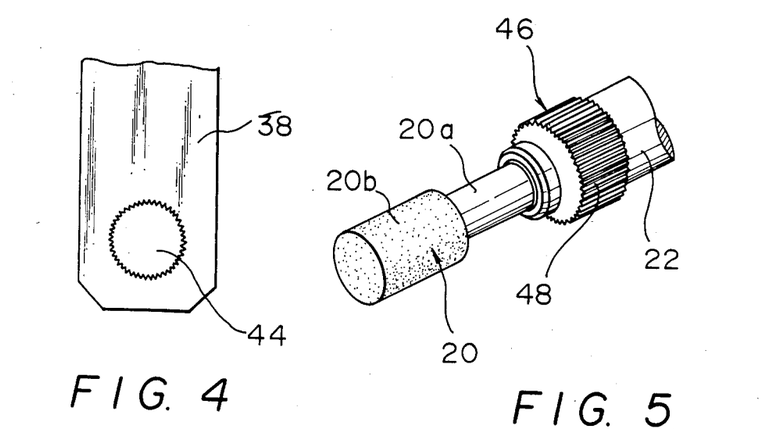
FIG. 4 is a front view showing an engaging portion of the quill arm assembly in an extracted state.
FIG. 5 is a perspective view illustrating a collet chuck in a state having a grindstone attached thereto.

As shown in FIG. 4, the engaging portion 38 includes a through-hole 44. The inner peripheral surface of the through-hole 44 includes an internal gear portion that meshes with a gear portion having triangularly shaped teeth formed on the outer peripheral surface of a screw ring 48 situated on the outer periphery of a collet chuck 46, which is attached to the distal end of the spindle 22, shown in FIG. 5. The engaging portion 38 is slid in the axial direction so that the internal gear portion thereof and the gear portion of the screw ring 48 mesh, whereby the screw ring 48 is lockingly engaged by the engaging portion 38 so that the rotation thereof is inhibited.

Figure 6:
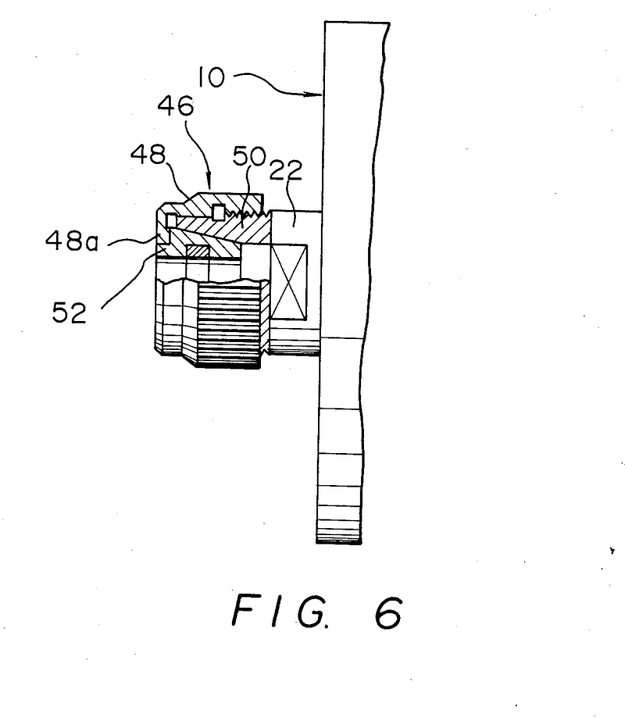
FIG. 6 is a partially sectional side view illustrating the construction of the collet chuck with a portion thereof broken away.

Reference will now be had to FIG. 6 to describe the collet chuck 46 attached to the end of the spindle 22 for detachably mounting the grindstone 20 on the spindle 22.

As shown in FIG. 6, the collet chuck 46 comprises a fixed ring 50 attached to the distal end of the spindle 22 in coaxial relation therewith and including a male screw portion on its outer periphery as well as a tapered surface on its inner periphery shaped so as to decrease in radius as the interior of the fixed ring is approached, the screw ring 48 having a female screw portion on its inner periphery for meshing with the male screw formed on the outer periphery of the fixed ring 50, as well as an inwardly directed flange 48a on its front end face, and a split ring 52 having a tapered surface on its outer periphery in sliding contact with the tapered surface of the fixed ring 50, a cylindrical surface on its inner periphery for holding a shaft portion 20a of the grindstone 20, and a plurality of slits formed in the axial direction so that the diameter of the inner peripheral surface of the split ring can be varied. The distal end of the split ring 52 lockingly engages the inwardly directed flange 48a of the screw ring 48.

Since the collet chuck 46 is thus constructed, the shaft portion 20a of the grindstone 20 may be loosely fitted into the inner circumferential space of the split ring in a state where the diameter of the inner periphery of the split ring 52 is enlarged by pulling out the screw ring 48. By then turning the screw ring 48 to mesh the threads, the screw ring 48 is made to move inwardly due to this threaded engagement, whereby the inwardly directed flange 48a of the screw ring engages the split ring 52 to move the latter inwardly. With such movement, the diameter of the inner periphery of the split ring 52 is reduced via the sliding contact between the tapered surfaces of the fixed ring 50 and split ring 52, so that the shaft portion 20a of grindstone 20 is fastened tightly by the split ring 52. The end result is that the grindstone 20 is fixedly secured to the distal end of the spindle 22 via the collet chuck 46.

It should be noted that this tightening operation can be carried out without turning the screw ring 48 of the collet chuck 46. For example, by turning the spindle 22 in a state where the rotation of the screw ring 48 is inhibited via the engaging portion 38 of the quill arm assembly 30, relative rotational motion can be produced between the fixed ring 50 and the screw ring 48, thereby making it possible to perform the tightening operation.

As shown in FIG. 3, the exchange arm assembly 28 comprises an exchange arm shaft 56 supported so as to rotate and slide freely via bearings 54 in a state where the shaft 56 is passed through the interior of the quill arm shaft 34, a radially extending exchange arm body 58 secured to the projecting end of the exchange arm shaft 56 projecting forwardly from the quill arm shaft 34, and a grasping portion 60 attached to the distal end of the exchange arm body 58 and capable of grasping a grindstone body 20b of the grindstone 20.

A swinging mechanism 62 is connected to the forward half portion of the exchange arm shaft 56 projecting rearwardly from the quill arm shaft 34. The swinging mechanism 62 is for rotatively driving the exchange arm shaft 56, that is, for swingingly driving the exchange arm assembly 30 in a state where movement is permitted in the axial direction. More specifically, the forward half portion of the rearwardly projecting part of the exchange arm 56 is formed to have a spline shaft configuration. The swinging mechanism 62 comprises a rack 64 slidingly driven in a direction perpendicular to the swing axis (i.e. in a direction perpendicular to the plane of the drawing) by a driving source (not shown), and a pinion 66 meshing with the rack 64 and splined on the outer periphery of the aforementioned forward half portion in coaxial relation with the exchange arm shaft 56.

Since the swinging mechanism 62 has the abovedescribed construction, the rack 64 moves with drive supplied by a driving source such as a cylinder (not shown), thereby rotating the pinion 66. Accordingly, the exchange arm shaft 56, namely the exchange arm assembly 28, is swung in a state where movement of the exchange arm shaft 56 is allowed in the axial direction via the spline joint.

The rearward half of the rearwardly projecting portion of exchange arm shaft 56 is connected to the exchange arm moving mechanism 68, which is for the purpose of moving the exchange arm assembly 28 in the axial direction. The exchange arm moving mechanism 68 has a hydraulic cylinder 70 integrally mounted on the slide base 26. The rearward half of the rearwardly projecting portion of exchange arm shaft 56 is inserted as a piston rod 72 into the cylinder 70. A piston 74 is secured coaxially to the rear end of the exchange arm shaft 56 received in the cylinder 70. Hydraulic ports 76a, 76b for introducing pressurized oil into the cylinder 70 from a hydraulic source (not shown) are attached to the front and rear portions of the cylinder 70, respectively.

Since the exchange arm moving mechanism 68 has the above-described construction, pressure directed to the right in the Figure acts upon the piston 74 in response to a high hydraulic pressure from the hydraulic port 76b acting upon the other hydraulic port 76a. Accordingly, the exchange arm assembly 28 is moved so as to be received in its entirety within the quill arm shaft 34. Pressure directed to the left in the Figure acts upon the piston 74 in response to a high hydraulic pressure from the hydraulic port 76a acting upon the hydraulic port 76b. Accordingly, the exchange arm assembly 28 is moved so as to be projected from the quill arm shaft 34 in its entirety.

A clutch mechanism 78 is provided between the quill arm shaft 34 and the exchange arm shaft 56 for the purpose of connecting and disconnecting these two shafts. The clutch mechanism 78 includes a plurality of axially extending engaging pieces 80 integrally provided on the outer periphery of the exchange arm shaft 56 situated inside the hollow portion of the quill arm shaft 34, and a plurality of axially extending locking pieces 82 integrally provided on the inner peripheral surface of the hollow portion of quill arm shaft 34 so as to be engageable with the engaging pieces 80 in the rotational direction.

Figure 7:
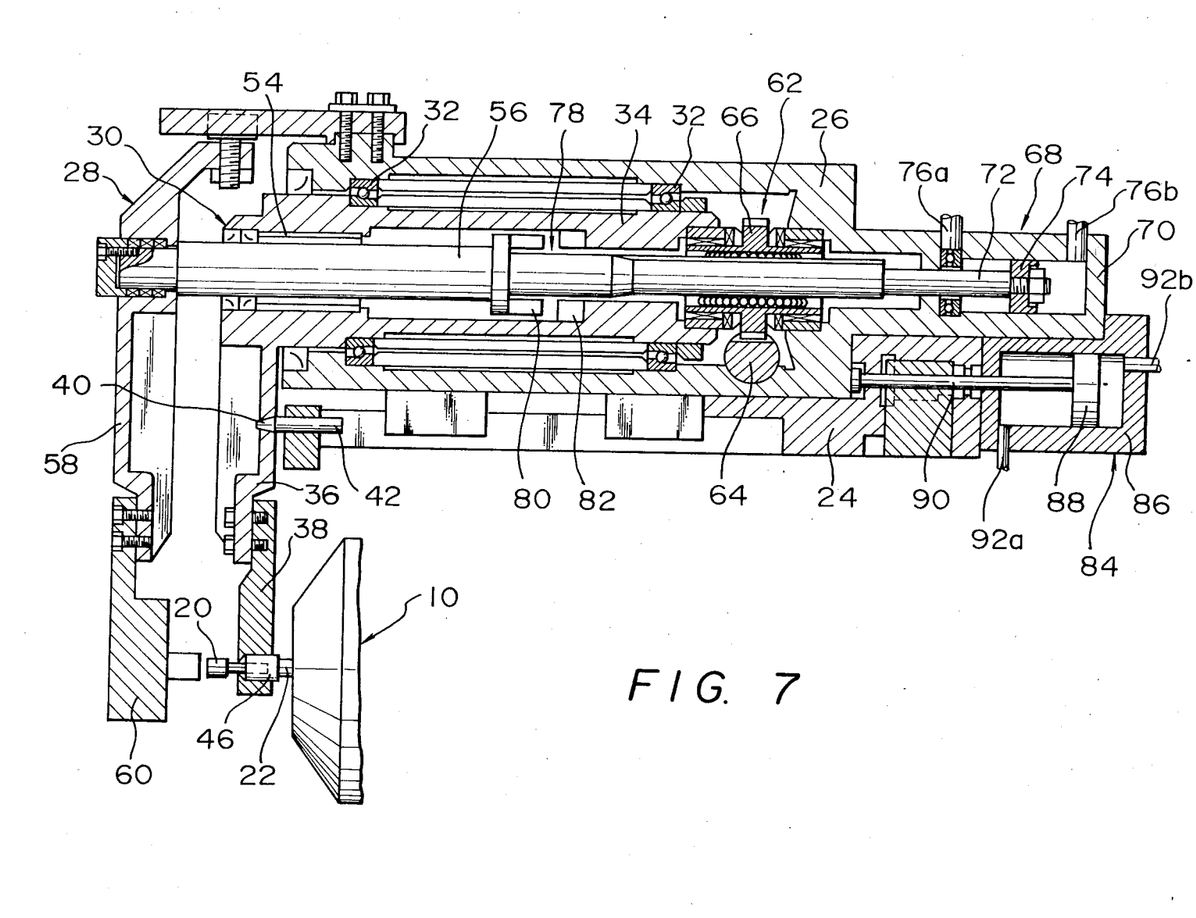
FIG. 7 is a side section illustrating the exchanging mechanism in a state where only the exchange arm assembly is spaced away from the spindle.

Since the clutch mechanism 78 is constructed as set forth above, the exchange arm shaft 56 is driven so as to be drawn into the quill arm shaft 34 in response to a high hydraulic pressure from the hydraulic port 76b acting upon the hydraulic port 76a. As a result, the engaging pieces 80 occupy positions between the locking pieces 82, as shown in FIG. 3. Accordingly, when the exchange arm shaft 56 is turned by operation of the swinging mechanism 62, the quill arm shaft 34 rotates together with the exchange arm shaft 56 via engagement between the engaging pieces 80 and locking pieces 82. The exchange arm shaft 56 is driven so as to be projected outwardly from the quill arm shaft 34 in response to a high hydraulic pressure from the hydraulic port 76a acting upon the hydraulic port 76b. As a result, the engaging pieces 80 are separated from the locking pieces 82, as shown in FIG. 7. Accordingly, even if the exchange arm shaft 56 is turned by operation of the swinging mechanism 62, the engaging pieces 80 and the locking pieces 82 do not engage. Consequently, only the exchange arm shaft 56 turns independently without rotation of the quill arm shaft 34.

The support base 24 is provided with a slide base moving mechanism 84 for moving the slide base 26 in the axial direction. The slide base moving mechanism 84 has a hydraulic cylinder integrally attached to the rear end of the support base 24, a piston 88 slidably provided inside the cylinder 86, and a piston rod 90 having one end connected to the rear end of the slide base 26 and its other end connected to the piston 88. Hydraulic ports 92a, 92b for introducing pressurized oil into the cylinder 86 from a hydraulic source (not shown) are attached to the front and rear portions of the cylinder 86, respectively.

Since the slide base moving mechanism 84 has the above-described construction, pressure directed to the left in the Figure acts upon the piston 88 in response to a high hydraulic pressure from the hydraulic port 92a acting upon the other hydraulic port 92b. As a result, the slide base 26 moves leftward, as shown in FIG. 3. In this state, the locking portion 38 of the quill arm assembly 30 is separated from the screw ring 48 of the collet chuck 46 provided on the distal end of the spindle 22.

Figure 8:
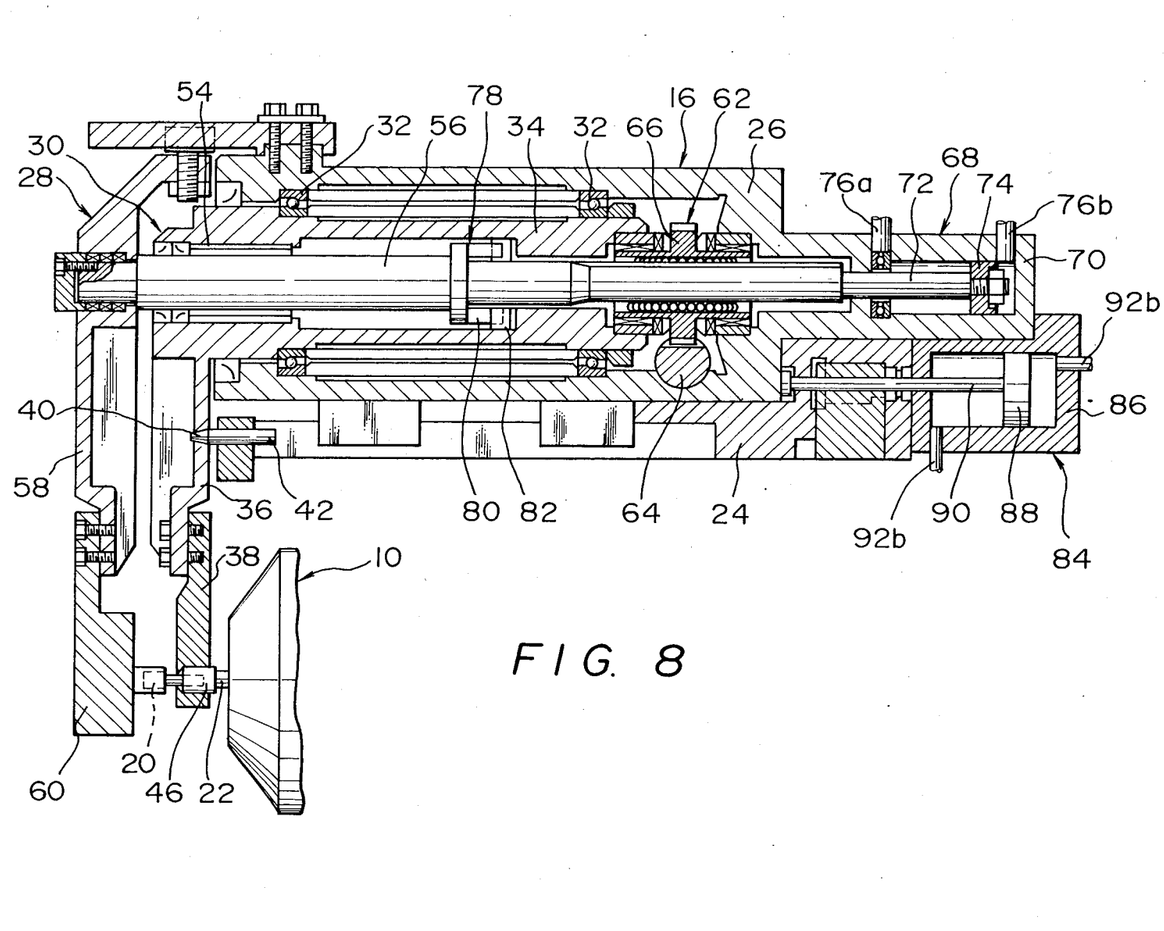
FIG. 8 is a side section illustrating an exchanging mechanism in a state where the exchange arm assembly is engaged with the grindstone attached to the collet chuck and the quill arm assembly is engaged with the collet chuck.

Pressure directed to the right in the Figure acts upon the piston 88 in response to a high hydraulic pressure from the hydraulic port 92b acting upon the hydraulic port 92a. As a result, the slide base 26 moves rightward, as shown in FIG. 8. In this state, the locking portion 38 of the quill arm assembly 30 engages the screw ring 48 of the collet chuck 46 provided on the distal end of the spindle 22, thereby inhibiting rotation of the screw ring 48.

As set forth above, the exchange arm assembly 28 is movable axially with respect to the slide base 26 via the exchange arm moving mechanism 68. As a result, in a state where the locking portion 38 of the quill arm assembly 30 is engaged with the screw ring 48 of the collet chuck 46 via the slide base moving mechanism 84, the grasping portion 60 of the exchange arm assembly 28 is movable between a position at which it grasps the grindstone body 20b of the grindstone 20 mounted in the collet chuck 46, as shown in FIG. 8, and a position at which it is spaced away from the grindstone body 20b, as shown in FIG. 7.

Figure 9:
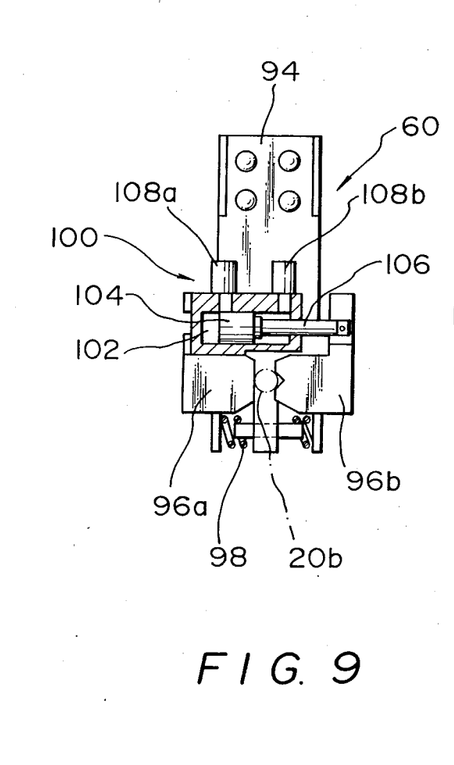
FIG. 9 is a back view illustrating, partially in section, illustrating the construction of a grasping portion of the exchange arm assembly.

As shown in FIG. 9, the grasping portion 60 of the exchange arm assembly 30 includes a grasping body 94 fixedly secured to the distal end of the exchange arm body 58, and a pair of pads 96a, 96b mounted on the grasping body 94 and arranged to oppose each other. The grindstone body 20*b* of the grindstone 20 is grasped by being embraced by the two pads 96*a*, 96*b*. The one pad 96*a* has a planar gripping surface and is movably attached to the grasping portion main body 94. The other pad 96*b* has a gripping surface formed to include a V-shaped groove and is movably attached to the grasping body 94. More specifically, the pad 96*b* is attached to the grasping body 94 so as to be capable of approaching and separating from the pad 96*a*.

A compression coil spring 98 is provided between the two pads 96*a*, 96*b* and biases the two pads 96*a*, 96*b* away from each other. A hydraulic cylinder unit 100 is connected to the movable pads 96*a*, 96*b* for causing them to approach the grasping body 94.

The hydraulic cylinder unit 100 includes a cylinder 102 integrally attached to the pad 96*a*, a piston 104 provided freely slidably inside the cylinder 102, and a piston rod 106 having one end connected to the piston 104 and its other end connected to the pad 96*b*. Hydraulic ports 108*a*, 108*b* for introducing pressurized oil into the cylinder 102 from a hydraulic source (not shown) are attached to the left and right ends of the cylinder 102, respectively.

Since the grasping portion 60 has the above-described construction, pressure directed to the right in the Figure acts upon the piston 104 in response to a high pressure from the hydraulic port 108*b* acting upon the other hydraulic port 108*a*. The pads 96*a*, 96*b* are urged and moved by the urging force of the compression coil spring 98 so as to separate from the body 94 and from each other by a suitable distance. In this state, the main body 20*b* of the grindstone 20 is loosely inserted between the two pads 96*a*, 96*b*.

Pressure directed to the left in the Figure acts upon the piston 104 in response to a high pressure from the hydraulic port 108*a* acting upon the other hydraulic port 108*b*. The pads 96*a*, 96*b* are moved against the urging force of the compression coil spring 98 so as to approach the body 94. In this state, the main body 20*b* of the grindstone 20 inserted between the two pads 96*a*, 96*b* is firmly gripped thereby.

As mentioned above, the gripping surface of the pad 96*a* is planar and the gripping surface of the pad 96*b* has the V-shaped groove. Accordingly, as the result of this arrangement including the two gripping surfaces and the hydraulic cylinder unit 100, the main body 20*b* of the grindstone 20 can be gripped assuredly regardless of its diameter.

The aforementioned magazine mechanism 18 will now be described with reference to FIG. 10.

Figure 10:
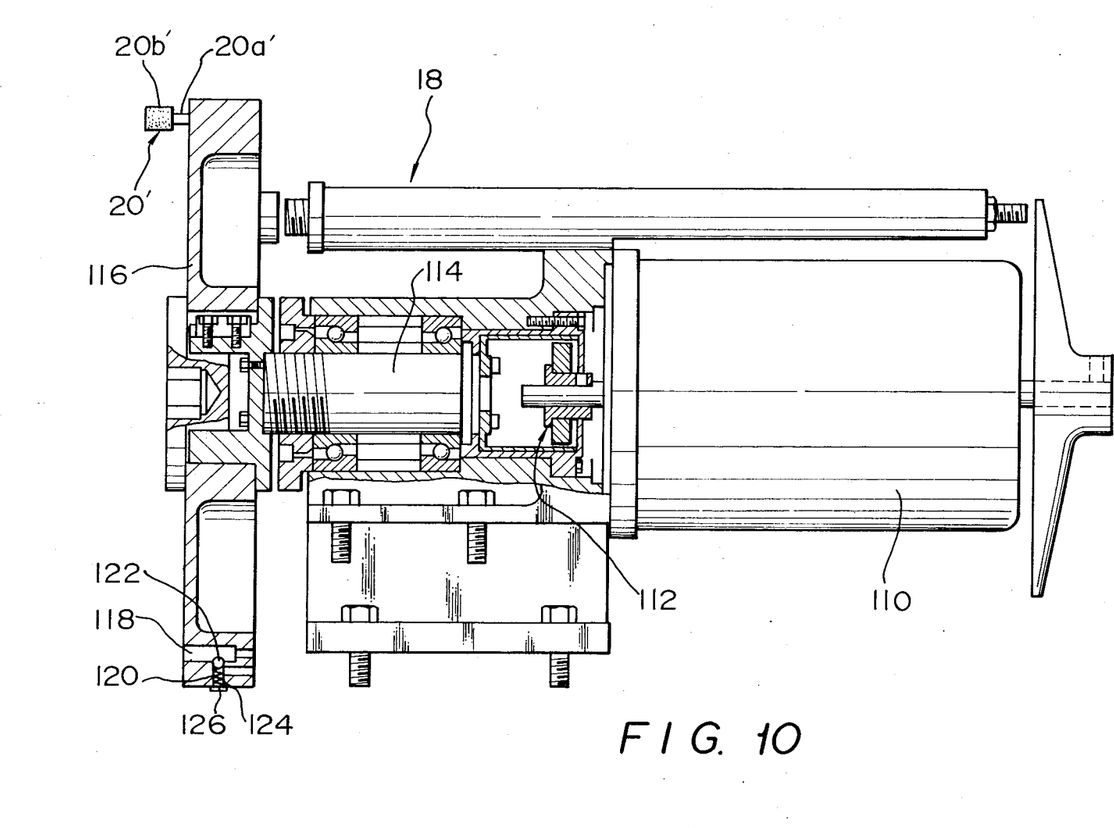
FIG. 10 is a sectional side view illustrating, partially in section, the construction of a magazine mechanism.

As shown in FIG. 10, the magazine mechanism 18 includes a drive motor 110 serving as a driving source, a rotary shaft 114 which is rotatively driven by a driving force from the drive motor 110 transmitted via a transfer gear mechanism 112, and a magazine body 116 coaxially secured to the distal end of the rotary shaft 114 and holding a number of new grindstones 20' on its periphery. The magazine body 116 is disk-shaped and its outer peripheral portion is formed to include a number of equidistantly spaced through-holes 118 in which shaft portions 20*a*' of the grindstones 20' are inserted.

Each of the through-holes 118 communicates with a side hole 120 formed so as to open to the outer circumferential surface of the magazine body 116. Accommodated within the side hole 120 is a locking ball 122 a portion of which projects into the through-hole 118. The locking ball 122 is biased by a coil spring 124, which is accommodated within the through-hole 118, in such a manner that a portion thereof projects into the through-hole 118. The coil spring 124 is prevented from falling out of the side hole 120 by a cap 126 covering the side hole.

Since the magazine mechanism 18 is constructed as set forth above, the grindstone 20' is retained in the through-hole 118 and is prevented from falling out by the locking ball 122 biased by the coil spring 124 in a state where the shaft portion 20*a*' is inserted in the through-hole 118. The holding force derived from the locking ball 122 is small. Therefore, when the grindstone body 20*b*' of the grindstone 20' is grasped the exchange arm assembly 28 and moved in the axial direction in the grindstone exchange operation, the grindstone 20' is readily extracted from the through-hole 118.

The grindstone apparatus 10 serving as a machine tool will now be described with reference to FIGS. 11 and 12.

The grindstone apparatus 10 includes a housing 128, the freely rotatable spindle 22 extending horizontally in parallel with the housing 128 and having one end led out from the housing, and an electric motor 130 for rotating the spindle 22 at high speed. The collet chuck 46 is attached to the end of the spindle 22 projecting from the housing 128.

A first spline shaft 132 is secured coaxially to the other end of the spindle 22 received in the housing 128. A coupling shaft 134 movable in the axial direction is provided on the housing 128 in a state opposing the first spline shaft 132 and in alignment with the spindle 22. The end of the coupling shaft 134 opposing the first spline shaft 132 is provided with a first boss 136 in which the first spline shaft 132 is fitted. The other end of the coupling shaft 134 projects rearwardly from the rear face of the housing 128. Connected to the other end of the coupling shaft 134 is a hydraulic cylinder unit 138 for driving the coupling shaft 134 in the axial direction.

The hydraulic cylinder unit 138 includes a cylinder 140 attached to the rear face of the housing 128 and internally accommodating the other end of the coupling shaft 134 as a piston rod, and an axially movable piston 142 provided in the cylinder 140 and secured coaxially to the other end of the coupling shaft 134. Attached to the left and right ends of the cylinder 140 are respective hydraulic ports 144*a*, 144*b* for introducing pressurized oil into the cylinder 140 from a hydraulic pressure source, not shown. A second boss 146 is secured coaxially to the piston 142 on the side face thereof opposite to that to which the coupling shaft 134 is attached.

A hydraulic motor 148 is attached coaxially to the rear portion of the cylinder 140 of the hydraulic cylinder unit 138. The hydraulic motor 148 has a drive shaft 150. A second spline shaft 152 fitted into the second boss 146 is secured coaxially to the end of the drive shaft 150 on the side of the piston 142. The second spline shaft 152 and second boss 146 are in mutual engagement at all times and transfer a rotative driving force from the drive shaft 150 to the coupling shaft 134 and allow movement axially of the drive shaft 134.

Figure 13:
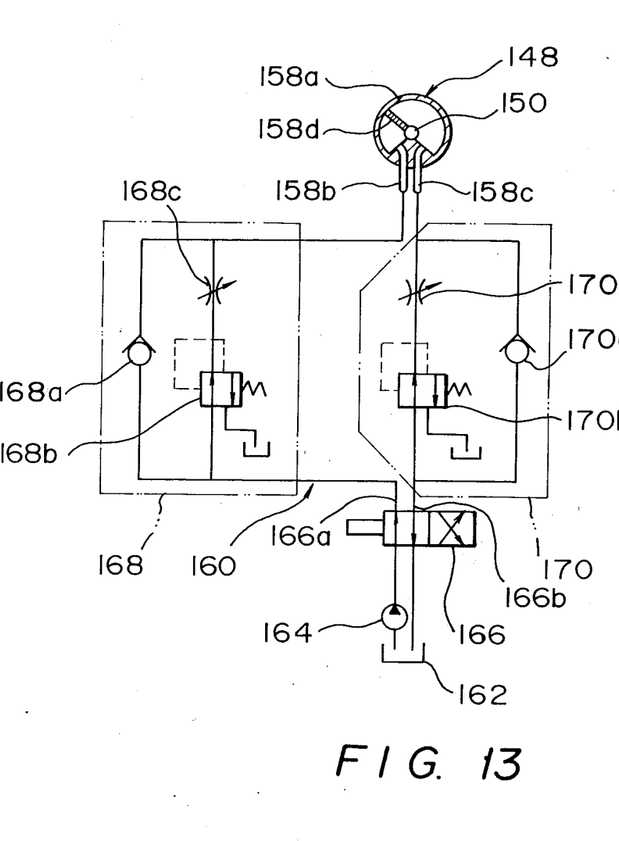
FIG. 13 is a view illustrating the construction of a hydraulic motor and the arrangement of fluid lines connected to the hydraulic motor.

In the present embodiment, the hydraulic motor 148 is constituted by a fluid pressure-type rotary actuator capable of rotating the drive shaft 150 over about 270° at high torque. More specifically, as shown in FIG. 13, the hydraulic motor 148 comprises a motor body 158*a* having a hollow cylindrical configuration, a pair of fluid outlet/inlet ports 158*b*, 158*c* connected to the motor body 158*a*, and a rotary vane 158*d* arranged within the motor body 158a so as to partition the fluid outlet/inlet ports 158b, 158c. The rotary vane 158d is rotatively driven over about 270° by fluid pressure acting upon the fluid outlet/inlet port 158b.

The rotary vane 158d is integrally connected to the drive shaft 150. Thus, the drive shaft 150 is rotatively driven by the pressure of the working fluid acting upon the outlet/inlet port 158b. The other outlet/inlet portion 158c acts as a return port for the working fluid in the motor body 158a.

In order for the fluid pressure to act upon the fluid outlet/inlet port 158b and for fluid conforming to the pressure action to be drawn from the interior of the motor body 158a, a fluid line system 160 is connected to the fluid outlet/inlet ports 158b, 158c, as shown in FIG. 13.

The fluid line system 160 comprises a tank 162 in which the working fluid is pooled, a pump 164 for drawing up the working fluid pooled in the tank 162, and a two-position, four-port changeover valve 166 arranged between the pump 164 and the two fluid outlet/inlet ports 158b, 158c for selectively applying the working fluid drawn up by the pump 164 to the two outlet/inlet ports 158b, 158c. A device 168 for regulating pressure on the tightening side is interposed between a port 166a on one outlet side of the changeover valve 166 and the fluid outlet/inlet port 158b. A device 170 for regulating pressure on the return side is interposed between a port 166b on another outlet side of the changeover valve 166 and the fluid outlet/inlet port 158c.

The tightening-side pressure regulator 168 and the return-side pressure regulator 170 are arranged so as to have check valves 168a, 170a, relief valves 168b, 170b and variable throttle valves 168c, 170c, respectively. The relief valves 168b, 170b and the variable throttle valves 168c, 170c are set in such a manner that the output fluid pressure in the return-side pressure regulator 170 is greater than that in the tightening-side pressure regulator 168.

The coupling shaft 134, hydraulic cylinder unit 138 and hydraulic motor 148 construct a spindle rotating mechanism 154.

The spindle rotating mechanism 154 is provided with a first sensor 172 in order to sense the axial position of the coupling shaft 134 in the hydraulic cylinder unit 138, namely the state of engagement between the first spline shaft 132 of spindle 22 and the first boss 136 of the coupling shaft 134.

The first sensor 172 is arranged in the vicinity of the second boss 146 of the coupling shaft 134 in cylinder 140. As shown in FIG. 11, the first sensor 172 is turned on by the second boss 146 in a state where a high hydraulic pressure acts upon the first hydraulic port 144a to draw in the coupling shaft 134 rearwardly so that the first spline shaft 132 and first boss 136 separate from each other. As shown in FIG. 12, the first sensor 172 is turned off in a state where a high hydraulic pressure acts upon the second hydraulic port 144b to thrust out the coupling shaft 134 forward so that the first spline shaft 132 and first boss 136 join.

Figure 11:
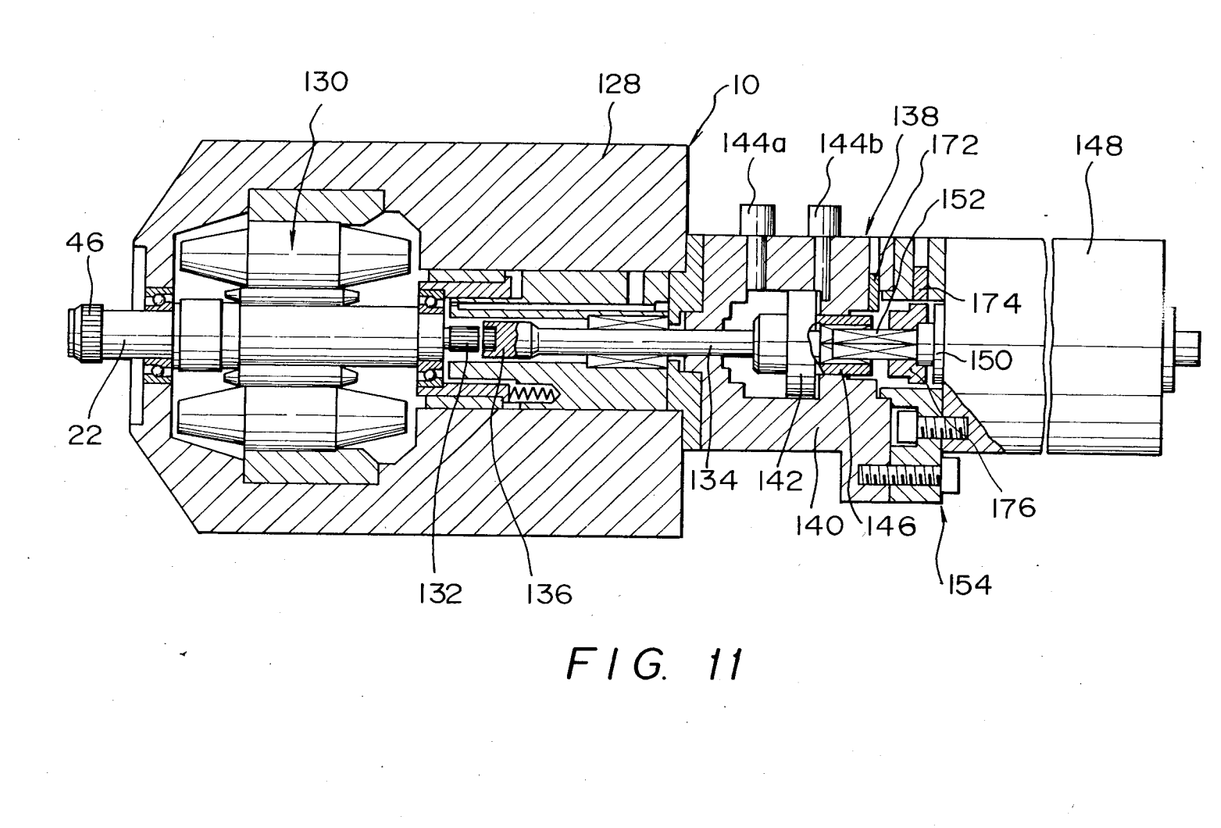
FIG. 11 is a side sectional view illustrating the construction of the grindstone apparatus in a state where a first spline shaft and a first boss are spaced apart.
Figure 12:
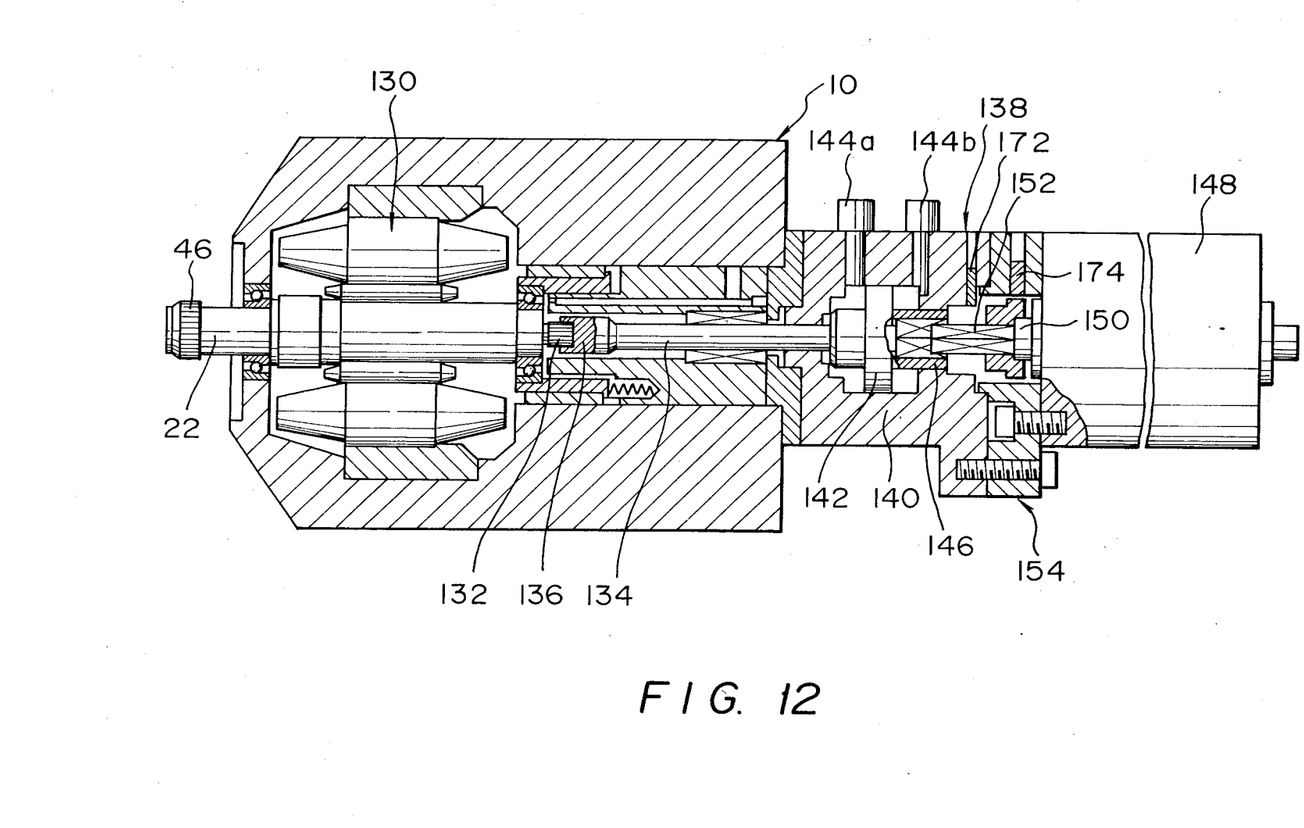
FIG. 12 is a side sectional view illustrating the construction of the grindstone apparatus in a state where
Figure 14:
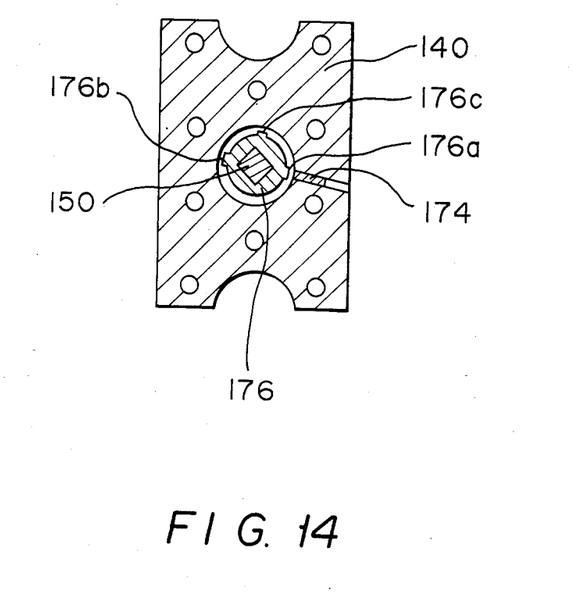
FIG. 14 is a sectional view illustrating the arrangement of a second sensor.

As shown in FIGS. 11 and 14, the spindle rotating mechanism 154 is provided with a second sensor 174 for sensing, in a contactless manner, the rotational position of the drive shaft 150 of hydraulic motor 148. As shown in FIG. 14, a ring 176 for being sensed is arranged on the periphery of the drive shaft 150 so as to rotate together therewith in such a manner that the rotational position of the drive shaft 150 may be sensed by the second sensor 174. Three projections 176a, 176b, 176c spaced apart from one another circumferentially are fixedly secured on the outer circumferential surface of the ring 176 in a manner capable of confronting the second sensor 174.

Among these three projections 176a, 176b, 176c, the first projection 176a functions as a reference projection, and the second projection 176b functions as a projection for sensing tightening and is arranged at a position 180° removed from the reference projection 176a. The third projection 176c functions as a projection for sensing return and is arranged at a position 270° removed from the reference projection 176a in the clockwise direction in FIG. 14.

Since the first and second sensors 172, 174 are thus provided, the state of the hydraulic pressure acting upon the hydraulic pressure ports 144a, 144b in the hydraulic cylinder unit 138 and the state of rotative drive of the drive shaft 150 in the hydraulic motor 148 are controlled based on the results of the sensing operations performed by the aforementioned sensors.

Since the grindstone apparatus 10 has the construction described above, a high hydraulic pressure from the hydraulic pressure port 144b acts upon the hydraulic pressure port 144a of the hydraulic cylinder unit 138, as a result of which pressure directed to the right in the Figure acts upon the piston 142 to move the coupling shaft 134 rightward. The first spline shaft 132 and first boss 136 are thus separated from each other, as shown in FIG. 11, thereby turning on the first sensor 172. In other words, the spindle 22 is placed in a state where it is cut off from the spindle rotating mechanism 154. In this state, the spindle 22 is rotatively driven at high speed by the electric motor 130.

In response to a high hydraulic pressure from the hydraulic pressure port 144a that acts upon the hydraulic pressure port 144b, a leftwardly directed pressure acts upon the piston 142, whereby the coupling shaft 134 is moved leftward. The first spline shaft 132 and first boss 136 are thus joined, as shown in FIG. 12, thereby turning off the first sensor 172. As a result, the spindle 22 is rotatively driven at a low speed and high torque due to rotation of the coupling shaft 134 based on drive supplied by the hydraulic motor 148.

If the collet chuck 46 is arranged to provide the tightened state (i.e. if the grindstone 20 has been attached) when the hydraulic motor 148 is driven with the spindle 22 and coupling shaft thus joined together, the drive shaft 150 is rotated clockwise 180° from the state in which the second sensor 174 senses the reference projection 176a until it senses the second projection 176b. If the collet chuck 46 is arranged to provide the loosened state (i.e. if the grindstone 20 has been removed) when the hydraulic motor 148 is driven with the spindle 22 and coupling shaft joined together, the drive shaft 150 is rotated counterclockwise 270° from the state in which the second sensor 174 senses the reference projection 176a until it senses the third projection 176c.

As shown in FIG. 1, a chute 156 is provided below the exchange arm body 58 at an intermediate position of the swinging range of the arm body. The chute 156 receives the grindstone 20 released by the grasping portion 60 of the exchange arm assembly 28 and guides the grindstone to a scrap box, not shown.

The operation of the grindstone apparatus 10 and automatic grindstone exchanging apparatus 12 arranged as set forth above will now be described.

Described first will be a grinding operation performed by the grindstone 20 in the grindstone apparatus 10.

When a grinding operation is performed, a high hydraulic pressure from the hydraulic pressure port 144b acts upon the hydraulic pressure port 144a of the hydraulic cylinder unit 138, as a result of which the first spline shaft 132 and first boss 136 are spaced apart from each other, as shown in FIG. 11. Thus, the first sensor 172 is turned on and the spindle 22 is capable of being rotatively driven at high speed by the electric motor 130.

As for the automatic grindstone exchanging apparatus 12, the exchange arm assembly 28 and the quill arm assembly 30 are held at their standby positions opposing the magazine mechanism 18, as indicated by the one-dot chain line in FIG. 1.

Thus, the grindstone 20 integrally attached to the distal end of the spindle 22 of grindstone apparatus 10 via the collet chuck 46 is rotatively driven at high speed as the electric motor 130 is driven into rotation, thereby grinding a workpiece (not shown).

With the exchange arm assembly 28 and quill arm assembly 30 retained at their standby positions described above, a high hydraulic pressure from the hydraulic pressure port 92a acts upon the hydraulic pressure port 92b of the slide base moving mechanism 84, as a result of which the slide table 26 is moved leftward, as shown in FIG. 3. At the same time, a high hydraulic pressure from the hydraulic pressure port 76b acts upon the hydraulic pressure port 76a of the exchange arm moving mechanism 68, as a result of which the exchange arm shaft 56 is moved rightward in the Figure. Thus, the engaging piece 80 and the locking piece 82 are joined together in the clutch mechanism 78, so that the exchange arm shaft 56 and quill arm shaft 34 rotate in unison.

If the grindstone 20 is worn beyond its service life with elapse of machining time as grinding is being performed by the grindstone 20, the latter is exchanged.

When the grindstone is exchanged, drive of the electric motor 130 in the grindstone apparatus 10 is halted and a high hydraulic pressure from the hydraulic pressure port 144a acts upon the hydraulic pressure port 144b of the hydraulic cylinder unit 138. As a result, the coupling shaft 134 is driven leftward in the Figures so that the first spline shaft 132 and first boss 136 are joined. Thus, the first sensor 172 is turned off and the spindle 22 is placed in a state where it is capable of being driven at a low rotational speed and high torque by a driving force from the hydraulic motor 148 of spindle rotating mechanism 154.

In the automatic grindstone exchange apparatus 12, the exchange arm shaft 56 is rotated via the pinion 66 by moving the rack 64 of the swinging mechanism 62 when the grindstone exchange is performed. As a result, the exchange arm body 58 is swung from the standby position indicated by the one-dot chain line in FIG. 1 to the exchange position indicated by the solid line. At this time the clutch mechanism 78 is in the engaged state, as set forth earlier, so that the quill arm shaft 34 rotates in unison with the exchange arm shaft 56 as the latter rotates. Accordingly, the quill arm body 36 also swings from its standby position to the exchange position just as the exchange arm body 58.

With the exchange arm body 58 and quill arm body 36 thus being brought to the exchange position, a high hydraulic pressure from the hydraulic pressure port 92b acts upon the hydraulic pressure port 92a of the slide base moving mechanism 84. As a result, the slide base 26 is moved rightward in the Figures to assume the state shown in FIG. 8. Before the state shown in FIG. 3 is attained, a high hydraulic pressure from the hydraulic pressure port 108b acts upon the hydraulic pressure port 108a of the hydraulic cylinder unit 100, as shown in FIG. 9, in the grasping portion 60 of the exchange arm assembly 28. Thus, the pads 96a, 96b are biased far away from the body 94 by the coil spring 98, so that the grindstone body 20b of the grindstone 20 is capable of being inserted between the two pads 96a, 96b.

With the exchange arm assembly 28 and quill arm assembly 30 in the states shown in FIG. 8, the grindstone body 20b of the grindstone 20 is loosely inserted between the two pads 96a, 96b of the grasping portion 60 of exchange arm assembly 28. Meanwhile, the screw ring 48 of the collet chuck 46 is inserted into the through-hole 44 in the locking portion 38 of the quill arm assembly 30 so that the two engage with each other.

In this state, the positioning pint 42 secured to the support base 24 is inserted in the conical hole 40 of the quill arm assembly 36. Thus, the insertion of the screw ring 48 into the through-hole 44 of locking portion 35 is executed reliably and subsequent swinging of the quill arm assembly 30 in this state is prevented.

In the state shown in FIG. 8, the hydraulic motor 148 of the spindle rotating mechanism 154 in grindstone apparatus 10 is driven so as to rotate the drive shaft 150 counter-clockwise in FIG. 14. The driving force is transmitted to the spindle 22 via the coupling shaft 134, so that the spindle 22 is rotated at a high torque and low speed through an angle of about 270° via the second sensor 174, as set forth above.

The screw ring 48 of the collet chuck 46 engages the locking portion 38 of the quill arm assembly 30, as mentioned above, whereby rotation of the screw ring is prevented. As a result, the screw ring 48 turns relative to the fixed ring 50 as the spindle 22 turns, so that the grindstone 20 is released from the grasp of the collet chuck 46. The grindstone 20 is thus capable of being removed from the spindle 22.

In this state, a high hydraulic pressure from the hydraulic pressure port 108a acts upon the hydraulic pressure port 108b of the grasping portion 60 of exchange arm assembly 28. As a result, the pads 96a, 96b are urged against the biasing force of the coil spring 98 and approach the body 94, thereby grasping the grindstone body 20b of the grindstone 20. The grindstone 20 is thus grasped by the grasping portion 60.

Thereafter, starting from this state, a high hydraulic pressure from the hydraulic pressure port 76a acts upon the hydraulic pressure port 76b of the exchange arm moving mechanism 68, as a result of which the exchange arm shaft 56 moves leftward in the Figure to assume the state shown in FIG. 7. In this state, the grindstone 20 grasped by the grasping portion 60 of exchange arm assembly 28 is removed from the spindle 22 and the clutch mechanism 78 is disengaged. Only the exchange arm assembly 28 is capable of swinging, the quill arm assembly 30 remaining in the presently prevailing state.

The exchange arm assembly 28 is swung from the exchange position to the standby position in FIG. 1 by moving the rack 64 of the swinging mechanism 62 in a direction opposite to that in which it was moved previously. In the course of this swinging motion, a high hydraulic pressure from the hydraulic pressure port 108b acts upon the hydraulic pressure port 108a of the grasping portion 60, so that the pads 96a, 96b are both moved away from the body 94. Consequently, the worn grindstone 20 removed from the spindle 22 falls from the grasping portion 60 under its own weight and is collected by the scrap box (not shown) via the chute 156.

After the used grindstone 20 is thus dropped, the exchange arm assembly 28 is brought to its standby position by being swung upwardly. A new grindstone 20' accommodated in the grindstone apparatus 10 is brought to a position opposing the grasping portion 60 of the exchange arm assembly 28, which is situated at the standby position, in accordance with rotation of the magazine body 116 of the magazine mechanism 18.

From this state, a high hydraulic pressure from the hydraulic pressure port 76b acts upon the hydraulic pressure port 76a of the exchange arm moving mechanism 68, whereby the exchange arm shaft 56 is moved rightward in the Figure. In response to a high hydraulic pressure from the hydraulic pressure port 108a acting upon the hydraulic pressure portion 108b of the grasping portion 60, the pads 96a, 96b grasp the grindstone body 20b' of the new grindstone 20'. The new grindstone 20' is thus grasped by the grasping portion 60.

Thereafter, a high hydraulic pressure from the hydraulic pressure port 76a acts upon the hydraulic pressure port 76b of the exchange arm moving mechanism 68, thereby moving the exchange arm shaft 56 leftward in the Figure. The new grindstone 20' is thus extracted from the magazine mechanism 18. By moving the rack 64 of the swinging mechanism 62 is a direction opposite to that in which it was moved previously, the exchange arm body 58 is swung from the standby position to the exchange position in a state where the new grindstone 20' is grasped by the grasping portion 60.

After the exchange arm body 58 is swung to the exchange position, a high hydraulic pressure from the hydraulic pressure port 76b acts upon the hydraulic pressure port 76a of the exchange arm moving mechanism 68, so that the exchange arm shaft 56 is moved rightward in the Figure. Thus, the shaft portion 20a' of the new grindstone 20' grasped by the grasping portion 60 is inserted into the collet chuck 46.

A high hydraulic pressure from the hydraulic pressure port 108b now acts upon the hydraulic pressure port 108a of the grasping portion 60, so that the grasping portion 60 releases its grip on the grindstone 20'. Thereafter, the hydraulic motor 148 of the spindle rotating mechanism 154 turns the spindle 22 through an angle of 180° in the clockwise direction, which is opposite to the direction in which it was rotated previously, thereby tightening the collet chuck. The new grindstone 20' is thus fixedly mounted on the spindle via the collet chuck 46.

Next, a high hydraulic pressure from the hydraulic pressure port 92a acts upon the hydraulic pressure port 92b of the slide base moving mechanism 84, so that the slide base 26 is moved leftward in the Figure. This movement is accompanied by leftward movement of both the exchange arm assembly 28 and quill arm assembly 30, so that the grasping portion 60 separates from the grindstone 20' and the locking portion 38 separates from the screw ring 48 of the collect chuck 46.

The rack 64 of the swinging mechanism 62 is then moved in a direction opposite that in which is was moved previously, as a result of which the exchange arm shaft 56 and the quill arm shaft 34, which is co-rotatably connected to the exchange arm shaft 56 via the clutch mechanism 78, turn in unison, whereby the exchange arm assembly 28 and quill arm assembly 30 are swung together from the exchange position to the standby position, at which the two assemblies are then held.

Meanwhile, in the spindle rotating mechanism 154, a high hydraulic pressure from the hydraulic pressure port 144b acts upon the hydraulic pressure port 144a of the hydraulic cylinder unit 138, as a result of which the coupling shaft 134 is moved rightward in the Figure. At the moment the first sensor 172 is turned on, the first spline shaft 132 and first boss 136 part from each other. Thus, the spindle 22 and the spindle rotating mechanism 154 are cut off from each other, so that the spindle 22 is capable of being rotatively driven at high speed by the electric motor 130.

Thus, the new grindstone 20' is automatically exchanged for the old and mounted on the spindle 22 of the grindstone apparatus 10 via the collet chuck 46 by the automatic grindstone exchanging apparatus 12.

Thus, in accordance with the present embodiment as described in detail hereinabove, the arrangement is such that the exchange arm shaft 56 and quill arm shaft 34 have their rotation transmitted via the clutch mechanism 78. As a result, the exchange arm shaft 56 and quill arm shaft 34 rotate in unison in a state where the clutch mechanism 78 is engaged.

In the state where the clutch mechanism 78 is disengaged, the exchange arm shaft 56 is capable of rotating independently while the quill arm shaft 34 is held fixed. Thus, in order to rotatively drive the exchange arm shaft 56 and the quill arm shaft 34, it will suffice to provide solely the swinging mechanism 62 for rotatively driving the exchange arm shaft 56. Means for rotatively driving the quill arm shaft 34 are unnecessary. Accordingly, the construction of the automatic grindstone exchange apparatus 12 is greatly simplified.

Further, the arrangement is such that the engagement and disengagement of the clutch mechanism 78 is executed by movement of the exchange arm shaft 56 by way of the exchange arm moving mechanism 68 to make the grasping portion 60 of the exchange arm assembly 28 approach and separate from the spindle 22. As a result, means for independently engaging and disengaging the clutch mechanism 78 are unnecessary, thus making it possible to greatly simplify the construction of the automatic grindstone exchanging apparatus 12.

The arrangement is such that the exchange arm shaft 56 and quill arm shaft 34 are accommodated coaxially, or more specifically, such that the exchange arm shaft 56 is received within the quill arm shaft 34. Thus, the operation of the exchange arm assembly 28 and the quill arm assembly 30 can be timed in a simple manner. In addition, with the clutch mechanism 78 in the disengaged state, the halted quill arm assembly 30 will not interfere with the swinging exchange arm assembly 28. This makes it possible for the exchange arm assembly 28 to swing independently in excellent fashion.

The present invention is not limited to the arrangement of the above-described embodiment but can be modified in various ways without departing from the scope of the claims.

For example, it has been described in the foregoing embodiment that a grindstone apparatus is used as the machine tool and a grindstone is employed as the tool.

However, the invention is not limited to such an application, for it is obvious that the invention can be applied to tools such as a drill or milling cutter or to a machine such as a cutting machine.

Further, the foregoing embodiment deals with an exchange apparatus in which a wearable tool such as a grindstone is used as the grindstone is exchanged when it is worn beyond its useful service life. However, a tool exchange is not limited solely to such a case. It goes without saying that the exchange apparatus of the invention can also be applied even when an exchange is made to select one type of tool from a variety of thereof, by way of example.

What is claimed is:

1. An automatic tool exchange apparatus comprising:
   a magazine for holding a plurality of tools in a freely detachable manner;
   a spindle of a machine tool a distal end whereof has a collet chuck in which a tool is loaded and which is tightened by a screw ring;
   a quill arm movable swingably and in an axial direction for engaging said screw ring, whereby rotation of said screw ring is inhibited;
   spindle rotating means for rotating said spindle in a state where rotation of said screw ring is inhibited by said quill arm, whereby said spindle and screw ring are caused to rotate relative to each other to loosen said collet chuck;
   an exchange arm movable swingably between said spindle and magazine and in an axial direction for extracting one tool held by said magazine and mounting the one tool on the distal end of said spindle;
   swinging means for swinging said quill arm and said exchange arm; and
   moving means for moving said quill arm and said exchange arm in the axial direction.

2. The automatic tool exchange apparatus according to claim 1, wherein said exchange arm and said quill arm have a common central swing axis and are set so as to be movable along the central swing axis.

3. The automatic tool exchange apparatus according to claim 2, wherein said quill ar is arranged on an outer periphery of said exchange arm in coaxial relation therewith.

4. The automatic tool exchange apparatus according to claim 2, further comprising rotating inhibition means for inhibiting rotation of said quill arm when said collet chuck is loosened.

5. The automatic tool exchange apparatus according to claim 4, wherein said rotation inhibiting means has a through-hole formed in said quill arm, and a locking pin formed at a fixed position where it is capable of being passed through said through-hole, said locking pin being passed through said through-hole of the quill arm to inhibit rotation of said quill arm when said collet chuck is loosened.

6. The automatic tool exchange apparatus according to claim 5, further comprising a support base for rotatably supporting said quill arm and said exchange arm, and
   wherein said locking pin is fixedly secured to said support base.

7. The automatic tool exchange apparatus according to claim 1, further comprising:
   a slide base for swingably supporting said quill arm;
   swinging means provided on said support base for swinging said exchange arm between said spindle and said magazine;
   exchange arm moving means provided on said slide base for moving said exchange arm in the axial direction;
   a support base on which said slide base is attached so as to be capable of moving in the axial direction;
   slide base moving means provided on said support base for moving said slide base in the axial direction; and
   first clutch means provided between said exchange arm and said quill arm for swinging said exchange arm and said quill arm in unison in a state where said slide base moving means has moved said quill arm and said exchange arm in a direction away from the distal end of said spindle and said exchange arm moving means has moved said exchange arm in a direction in which it will be received inside said quill arm.

8. The automatic tool exchange apparatus according to claim 7, wherein said spindle rotating means has driving means for rotating said spindle, and second clutch means for engaging said driving means and said spindle when said collect chuck is loosened.

9. The automatic tool exchange apparatus according to claim 8, wherein said driving means has a hydraulic driving motor.

10. The automatic tool exchange apparatus according to claim 9, wherein when a tool exchange is made, said hydraulic driving motor rotates said spindle at a low speed and high torque in comparison with speed and torque when machining is being performed by using a tool.

11. The automatic tool exchange apparatus according to claim 9, wherein said second clutch means has:
    a spline shaft formed on one end of said spindle;
    a coupling shaft one end portion of which has a boss capable of being splined with said spline shaft, said coupling shaft being moved in the axial direction to freely engage said spline shaft and said boss; and
    moving means for moving said coupling shaft in the axial direction;
    said coupling shaft being rotatably connected by a drive shaft of said hydraulic driving motor.

12. The automatic tool exchange apparatus according to claim 11, wherein said moving means has a hydraulic cylinder unit capable of moving the coupling shaft in the axial direction in a state where rotative drive of said coupling shaft is allowed.

13. The automatic tool exchange apparatus according to claim 7, wherein said quill arm is hollow and said exchange arm is freely rotatably passed through said quill arm.

14. The automatic tool exchange apparatus according to claim 1, wherein said exchange arm has grasping means on a distal end thereof for detachably grasping a tool.

15. The automatic tool exchange apparatus according to claim 14, wherein said grasping means has a grasping body fixedly attached to the distal end of said exchange arm, and a pair of grasping members attached to said grasping body for grasping the tool therebetween.

16. The automatic tool exchange apparatus according to claim 15, wherein one of said grasping members has a planar face for grasping the tool, and the other of said grasping members has a grooved face for grasping the tool.

* * * * *